Patented July 1, 1930

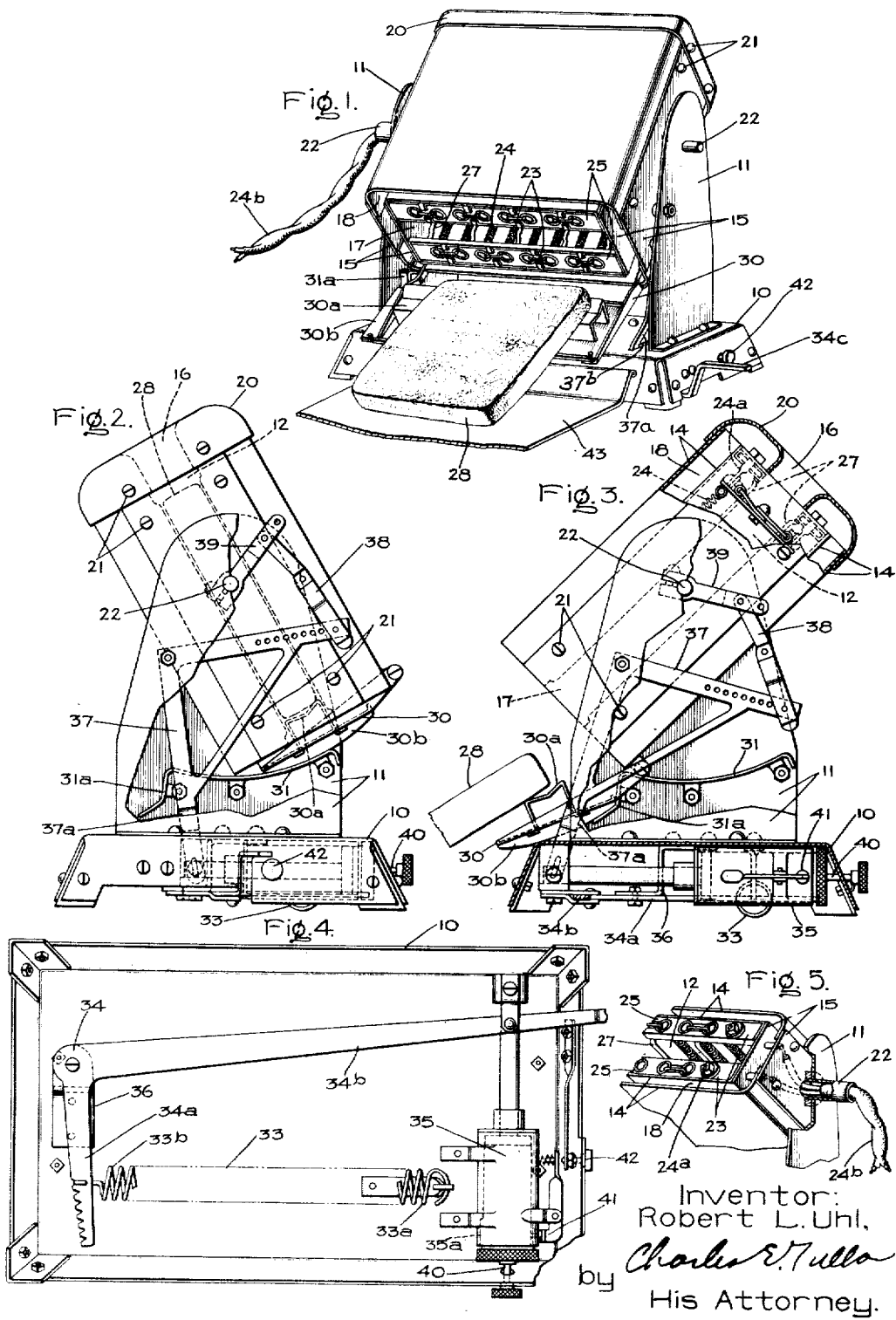

1,769,893

UNITED STATES PATENT OFFICE

ROBERT L. UHL, OF ONTARIO, CALIFORNIA, ASSIGNOR TO EDISON ELECTRIC APPLIANCE COMPANY, OF CHICAGO, ILLINOIS, A CORPORATION OF NEW YORK

TOASTER

Application filed May 1, 1929, Serial No. 359,658. Renewed April 18, 1930.

My invention relates to heaters, more particularly to toasters and the like, and has for its object the provision of a simple, reliable and efficient toaster wherein a slice of bread of the like will be subjected to a source of heat for a predetermined interval of time.

Although I have shown my invention as applied to an electrical bread toaster, obviously it may be employed for broiling meats, toasting sandwiches and like heating operations.

In carrying my invention into effect in one form thereof, I provide the toaster with a toasting chamber for receiving a slice of bread or the like so as to present the slice to a suitable source of heat. In order to control the period during which the slice will be subjected to the toasting operation, I move the toasting chamber and remove the toasted slice from the toasting chamber responsively to this movement.

For a more complete understanding of my invention, reference should be had to the accompanying drawing in which Fig. 1 is a perspective view of a toaster embodying my invention, the toaster being shown in its position in which the toasted slice has been discharged; Fig. 2 is an end elevation of the toaster with portions broken away to illustrate certain structural details, the toaster being shown in its position at the beginning of the toasting operation; Fig. 3 is an end elevation of the toaster with portions broken away to illustrate certain structural details, the toaster being shown in its position at the end of the toasting operation; Fig. 4 is a bottom view of the toaster illustrating certain portions of the toasting chamber actuating mechanism; and Fig. 5 is a perspective view of a portion of the toaster with portions broken away to illustrate certain structural details.

Referring to the drawing, I have shown my invention in one form as applied to an electric toaster, although obviously any suitable source of heat may be used. The toaster will comprise a suitable movably supported toasting chamber, actuating means for moving the chamber at a predetermined rate and means responsive to this movement of the chamber for effecting the removal of the toasted slice. As shown, the toaster comprises a suitable base member 10 provided with an upright support 11 at each end. Walls suitably interconnected are mounted in the frame or support formed by the parts 10 and 11 so as to form a substantially vertical movably supported toasting chamber 12. Preferably, the toasting chamber 12 will be formed by a pair of spaced walls 14 at each side and a pair of spaced walls 15 at each end. Thus, these walls 14 and 15 serve to form a closed toasting chamber having an opening 16 at the top and another opening 17 at the bottom. Preferably, the walls 14 and 15 will be formed of a suitable metallic material and thus the spaced wall construction serves to provide an air insulating space 18 between the toasting chamber and the outer metallic walls.

As shown, a suitable member 20, preferably of metallic construction, serves to connect the upper ends of the inner and outer walls which form the toasting chamber and thereby close the upper end of the air insulating space 18. By reason of this construction, the inner and outer walls are rigidly interconnected at their upper ends and thus, the toasting chamber structure as a whole is strengthened. It will be understood that the air space 18 serves to keep the outer metallic walls cool. It may be desirable in order to insure a cool outer wall to perforate the upper wall of the member 20 so as to allow air to circulate through the space 18. It will be understood that the spaced walls 14 and 15, which form the inner and outer linings, and the cover member 20 will be suitably secured. As shown, suitable screw fastening means 21 are provided for this purpose.

The toasting chamber 12 will be movably supported in its supporting frame structure by means of trunnions 22 which will be rotatably mounted in the end members 11. Thus it will be observed, by referring to Figs. 2 and 3, that the toasting chamber may be swung through a substantial arc upon its supporting trunnions.

Suitable heating means are provided for the toasting chamber 12. I prefer to employ electrical heating means which will be mounted within the toasting chamber itself. As shown, I provide two electrical heating elements 23 of suitable form. Preferably, each of these heating elements 23 will be substantially rectangular in shape so as to extend substantially over the distance between the bottom edge of the toasting chamber and the top of this chamber, as indicated in the drawing, and also substantially coextensive with the length of the toasting chamber, i. e., the distance between the inner end walls 15. Any suitable arrangement of heating units may be used. For example, each unit may consist of a length of resistance heating conductor 24 made of any suitable material, such as a nickel-chromium alloy, this conductor being secured on a support or framework 25 and passed in spaced lengths or convolutions which are coextensive with the desired heating area. It will be understood that the framework 25 will be secured to the inner walls in any suitable manner as, for instance, by means of the screw fasteners 21.

The heating conductors 24, preferably, will be connected in series relation with each other (Fig. 3) and will be connected with a suitable source of electrical supply by means of terminal members 24ª (Fig. 5), one of which will be provided for each end of the series connected conductor length. As shown, (Fig. 5) I conveniently provide external electrical connections for these terminal members through one of the trunnion members 22 which will be of hollow construction so as to receive the external conductor 24ᵇ. Spaced wire guards 27 are provided for each of the heating units. As shown, these guards extend in a vertical direction and are positioned between each heating unit and the toasting space so as to prevent the slice or the like being toasted from coming into direct contact with either of the heating elements.

It will be observed that by reason of the aforementioned construction and arrangement of the heating elements, the slice being toasted will be positioned so that each of its sides will be presented concurrently to the heating source.

It will be understood that the slice of bread or the like to be toasted will be inserted in the toasting chamber through the top opening 16 while the toasted slice will be removed from this chamber through the bottom opening 17. The slice 28 being toasted will be supported within the toasting chamber, however, by means of a suitable closure member or door 30 provided for the bottom opening 17. As shown, the closure member or door 30 will be provided with a raised up portion 30ª which, when the closure member is in its closed position (Fig. 2), will be inserted between the heating elements so as to support the slice 28 being toasted in proper toasting position with relation to these heating elements.

As has been pointed out, the toasting chamber 12 will be moved at a predetermined rate. Thus, the toasting chamber will be moved at a predetermined rate from its position at which the toasting operation is commenced (Fig. 2) to its position at which the toasting operation is finished (Fig. 3). It will be obvious that during this movement of the toasting chamber it will be necessary to hold the closure member or door 30 in its closed position so as to maintain the slice in proper toasting relation with the heating elements. For this purpose I provide a suitable bracket member 31, which as shown (Figs. 2 and 3) will be secured to one of the end members 11. This bracket member 31 serves to engage a projecting end 30ᵇ (Fig. 1) provided on the door 30 so that as the toasting chamber is moved during the toasting operation the door 30 will be secured in its closed position. It will be observed, however, that the bracket 31 is provided with a depending portion 31ª, which is so located that it will permit the door to open when the toasting chamber has reached substantially its limiting position (Fig. 3), i. e., the position at which the toasting operation is completed. As shown in Fig. 3, the depending portion 31ª serves to support the door 30 when it is in its open position. Thus, it will be understood that the closure member 30 is in effect a trap door which will be sprung open responsively to the movement of the toasting chamber, whereby when the toasting operation has been completed, as determined by the movement of the chamber, the door will be opened to permit the toasted slice to slide out of the inclined chamber. It will be observed from the foregoing that by suitably timing the movement of the toasting chamber, the slice will be subjected to the source of heat for the desired predetermined interval of time.

I conveniently cause the toasting chamber to move at a predetermined rate during the toasting operation by means of a suitable actuating spring 33, a suitable link mechanism which will serve to connect this spring with the toasting chamber and a suitable retarding mechanism for controlling the movement of the chamber. As shown (Fig. 4), the spring 33, which preferably will be of of the tension type, will be mounted beneath the toaster and will be enclosed by the base 10. One end 33ª of this spring will be secured to the base member 10, while the other end 33ᵇ will be secured to one arm 34ª of a fixedly pivoted bell crank 34, the other arm 34ᵇ of which will be operably connected to the toasting chamber 12 and to the retarding mechanism 35. The bell crank 34 will be fixedly pivoted with respect to the base and in spaced relation thereto by means of a suitable supporting bracket 36. As shown, the arm 34$^b$ of the bell crank will be connected mechanically with the toasting chamber by means of a fixedly pivoted bell crank 37, a link 38 and a crank arm 39. The bell crank 37, as shown, is fixedly pivoted on the inner side of one of the upright members 11. The arm 37$^a$ of the bell crank 37 extends through a slot 37$^b$ provided in the base 10 so that it may be mechanically connected with the arm 34$^b$ of the bell crank 34. The crank arm 39 is secured upon one of the trunnions 22 and is connected to the bell crank 37 by means of the link 38 so that when the bell crank 37 is moved about its fixed pivot, the crank 39 will be operated to swing the toasting chamber about its trunnion supports. It will be understood that since the arm 34$^b$ is mechanically connected with the dash pot mechanism, the actuating force transmitted from the spring 33 may be suitably controlled.

It will be observed that the link 38 may be adjusted to various positions on both the bell crank 37 and the crank arm 39 so that the arc of movement of the toasting chamber may be suitably varied. Thus, with a given spring tension and with a given retarding force, as determined by the setting of the dash pot 35, the timing of the toasting operation may be varied simply by changing the pivotal connections of the link 38. Moreover, as will be observed (Fig. 4), the force transmitted from the spring 33 to the toasting chamber may be varied by changing the spring connection with the arm 34$^a$ of the bell crank 34. Thus, with a fixed adjustment of the link 38 and with a fixed adjustment of the dash pot 35, the timing of the toasting operation may also be adjusted by varying the spring lever arm. The third and the most convenient method of setting the time for the toasting operation will be effected by means of the retarding mechanism 35. For this purpose I provide the dash pot with a suitable valve 40 which, as will be well understood, will suitably control the pressure of the dash pot and thus its retarding action. As shown, the valve will be provided with an operating knob exterior of the base so that the valve may be operated conveniently, as desired. In order to quickly relieve the pressure in the dash pot so that in case of an emergency as, for example, in case the toast should start to burn, the toasting chamber will be quickly swung to its position to discharge the toast, I provide the dash pot with a relief valve 41. The valve 41 will be provided with suitable operating means 42, shown as a push button, exterior of the base whereby it may be operated conveniently.

In operation, it will be understood that the toast will be inserted in the toasting chamber through the opening 16 with the chamber in the start position (Fig. 2). The chamber will then be swung toward the finish position (Fig. 3) at a predetermined rate as determined by the leverage setting of the actuating spring 33 and the setting of the valve 40 provided for the dash pot. At the end of a predetermined time interval as determined by these adjustments and the adjustment of the link 38, the trap door 30 will be opened, whereupon the toasted slice will slide out of the inclined chamber. A suitable container 43 may be provided to receive the toast from the chamber 12. The toasting chamber may then be returned manually to its start position by means of the bell crank lever 34, which will be provided with an operating handle or extension 34$^c$. It will be understood, of course, that as the chamber is returned to its start position, the trap door 30 will be closed by means of the bracket 31. Another slice may be inserted in the toasting chamber and the toasting operation repeated.

It will be understood that suitable means will be provided to limit the motion of the toasting chamber 12. Thus, the slot 37$^a$ may perform this function or suitable stops for engaging the bell crank 34 or the bell crank 37 or other movable portion of the link mechanism may be provided to limit the motion of the toasting chamber.

It may be desirable to render the retarding mechanism inoperative just before the trap door 30 is thrown open. It will be observed that this operation will impart a sort of snap action to the toasting chamber during the latter portion of its toasting movement. As a result of this action, the chamber will be brought against its limiting stop with a force sufficient to loosen the toasted slice should it adhere to the wire guards 27 provided in the toasting chamber. To thus render the retarding mechanism inoperative, I provide the dash pot cylinder with a recessed portion 35$^a$ of such length that just before the dash pot piston reaches the end of its retarding stroke the rear edge of the piston will pass the edge of the recessed portion and thereby relieve the pressure in the cylinder. It will be understood that instead of the recess 35$^a$ a vent may be suitably located in the dash pot cylinder so as to render the retarding mechanism inoperative just before the trap door 30 is opened.

It is to be noted that suitable timing means other than the dash pot mechanism may be provided for the toasting chamber 12. Thus, suitable clock work retarding mechanism may be provided for this purpose. In case a clock work retarding mechanism be provided, it may be desirable to provide means to indicate the desired timing of the toasting operation. To this end a pointer or other suitable indicator may be secured to one of the trunnions 22, the adjacent upright support 11 being provided with a suitable indicating scale for cooperating with the pointer.

While I have, in accordance with the provisions of the patent statutes, described my invention as embodied in concrete form and operating in a specific manner, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. A toaster or the like comprising walls forming a toasting chamber for receiving a slice of bread or the like, heating means for said toasting chamber, means for movably supporting said toasting chamber, means for moving said toasting chamber and means dependent upon the position of said toasting chamber for effecting the removal of said slice.

2. A toaster or the like comprising walls forming a toasting chamber for receiving a slice of bread or the like, heating means for said toasting chamber, means for movably supporting at least one of said walls, and time responsive means for moving said wall so as to effect the removal of the slice.

3. A toaster or the like comprising walls forming a toasting chamber for receiving a slice of bread or the like, heating means for said toasting chamber. means for movably supporting at least one of said walls, means for supporting the slice in toasting position within said toasting chamber, and time responsive means for moving said wall and said supporting means to effect the removal of the slice.

4. A toaster or the like comprising walls forming a toasting chamber for receiving a slice of bread or the like, heating means for said toasting chamber, means for moving supporting at least one of said walls, time element actuating means connected to operate said wall, means for supporting the slice in toasting position within said toasting chamber and means operably associated with said supporting means and responsive to movement of said wall for effecting the removal of the slice.

5. A toaster or the like comprising walls forming a toasting chamber for receiving a slice of bread or the like, heating means for said toasting chamber, means for movably supporting at least one of said walls, a member for supporting said slice within said toasting chamber, means for movably mounting said supporting member and time element means for controlling the movements of said wall and said supporting means so as to effect the removal of the slice from said chamber.

6. A toaster or the like comprising walls forming a toasting chamber, means for movably supporting said toasting chamber, actuating means for moving said toasting chamber at a predetermined rate, heating means for said toasting chamber and means for supporting a slice of bread or the like in toasting position within said toasting chamber, said supporting means being operated in response to the movement of said toasting chamber for effecting the removal of said slice.

7. A toaster or the like comprising walls forming a toasting chamber, means for movably supporting said toasting chamber, heating means for said toasting chamber, actuating means connected to move said toasting chamber through a predetermined path in a predetermined interval of time and means for effecting the removal of the toasted slice as said toasting chamber approaches one end of said path of movement.

8. An electric toaster or the like comprising walls forming a heating chamber, means for movably supporting said heating chamber, electrical heating means supported in said heating chamber, means for supporting a slice of bread or the like in heating relation with said electrical heating means, actuating means responsive to a time element operably connected with said heating chamber so as to move said chamber through a predetermined path of movement and means for effecting the removal of said slice as said chamber approaches one end of its predetermined path of movement.

9. A toaster or the like comprising walls forming a toasting chamber, said walls being pivoted so that said chamber may be swung through a predetermined arc, heating means for said toasting chamber, means for supporting a slice of bread or the like in toasting position within said toasting chamber, actuating means for moving said toasting chamber through its predetermined arc of movement, means for timing the movement of said toasting chamber and means operably associated with said slice supporting means for effecting the removal of said slice as said toasting chamber approaches one end of said arc of movement.

10. An electric toaster or the like comprising walls forming a heating chamber, means for movably supporting said heating chamber, electrical heating means supported in said heating chamber, means for supporting a slice of bread or the like in toasting position with respect to said heating means, resilient actuating means for moving said heating chamber through a predetermined path, resilient means operably associated with said resilient actuating means for retarding the movement of said heating chamber and means responsive to the movement of said heating chamber and cooperating with said slice supporting means for effecting the removal of said slice as said heating chamber approaches one end of its predetermined path of movement.

11. A toaster or the like comprising walls forming a toasting chamber for receiving a slice of bread or the like, heating means for said toasting chamber, means for movably supporting said toasting chamber, actuating means for moving said toasting chamber, means for retarding the motion of said toasting chamber whereby it is caused to move at a predetermined rate, means dependent upon the movement of said toasting chamber for effecting the removal of said slice and means for rendering said retarding means ineffective before the removal of said slice.

12. A toaster or the like comprising walls forming a toasting chamber, a support for pivotally mounting said toasting chamber, actuating means connected to move said toasting chamber about its pivotal support, heating means for said toasting chamber, means for supporting a slice of bread or the like in toasting position within said heating chamber and means cooperating with said slice supporting means for effecting the removal of said slice when said toasting chamber has been moved through a predetermined path.

13. An electric toaster or the like comprising walls forming a toasting chamber, means for pivotally supporting said toasting chamber, spring actuating means for moving said toasting chamber about its pivotal support, link mechanism interposed between said spring actuating means and said toasting chamber, means operably associated with said link mechanism for retarding the motion of said toasting chamber whereby said chamber is caused to move at a predetermined rate, heating means for said toasting chamber and means for supporting a slice of bread or the like in toasting position within said toasting chamber, said supporting means being operated in response to the movement of said toasting chamber for effecting the removal of said slice.

14. A toaster or the like comprising walls forming a toasting chamber, heating means for said chamber, means for pivotally supporting said chamber in a substantially upright position, said walls being provided with openings at the top and bottom of said chamber for the insertion and removal of the slice, means for holding the slice in said chamber and means for releasing the slice when said chamber is moved on said pivot to a predetermined position.

15. A toaster or the like comprising walls forming a toasting chamber, heating means for said chamber, means for pivotally supporting said chamber in a substantially upright position, said walls being provided with openings at the top and bottom of said chamber for the insertion and removal of the slice, means for supporting the slice in said chamber and means for removing said supporting means when said chamber is swung on said pivot to a predetermined position.

16. A toaster or the like, comprising walls forming a toasting chamber, heating means for said chamber, means for pivotally supporting said chamber in a substantially upright position, said walls being provided with openings at the top and bottom of said chamber for the insertion and removal of the slice, means for holding the slice in said chamber, means for releasing the slice when said chamber is moved on said pivot to a predetermined position and time element means for moving said chamber to said position.

17. A toaster or the like comprising walls forming a toasting chamber, heating means for said chamber, means for pivotally supporting said chamber in a substantially upright position, said walls being provided with openings at the top and bottom of said chamber for the insertion and removal of the slice, means for holding the slice in said chamber and time element means set in operation by movement of said chamber to another position for moving said chamber to said first position.

18. A toaster or the like comprising walls forming a toasting chamber, heating means for said chamber, means for pivotally supporting said chamber in a substantially upright position, said walls being provided with openings at the top and bottom of said chamber for the insertion and removal of the slice, a slice supporting member moved into operative position by movement of said chamber on said pivotal support to a predetermined position and released to effect the removal of the slice when the chamber is swung to another position and time element means set in operation by movement of said chamber to the first position for moving said chamber to the second position.

19. An electric toaster or the like comprising walls forming a toasting chamber, heating means for said toasting chamber, means for pivotally supporting said toasting chamber in a substantially vertical position, said chamber being provided with a bottom opening through which a slice of toast or the like may be ejected, closure means for said bottom opening operative to support said slice in toasting position, spring actuating means for moving said toasting chamber about its pivotal support, link mechanism interposed between said spring actuating means and said toasting chamber, means operably associated with said link mechanism for retarding the motion of said toasting chamber whereby said chamber is caused to move at a predetermined rate and means for locking said slice supporting means, said locking means being responsive to the movement of said toasting chamber so as to release said supporting means to effect the removal of the slice after said chamber has moved through a predetermined distance.

20. A toaster or the like comprising a supporting frame, spaced walls defining a toasting chamber pivotally mounted in a substantially vertical position upon said supporting frame whereby said toasting chamber may be swung between predetermined limiting positions, electrical heating means mounted within said chamber, said chamber being provided with a top opening through which a slice of bread or the like may be inserted in said chamber and a bottom opening through which the toasted slice may be ejected from said chamber, a trap door hinged to close said bottom opening and thereby support said slice during the toasting operation, a bracket mounted upon said supporting frame operative to maintain said trap door in its closed position as said toasting chamber is swung from its one limiting position to its other limiting position and for releasing said trap door to discharge said slice as the toasting chamber approaches its other limiting position, spring actuating means for moving said toasting chamber from its one to its other limiting position, adjustable link mechanism interposed between said spring actuating means and said pivotally mounted toasting chamber for transmitting the actuating force of said spring to said toasting chamber, a dash pot operably connected with said link mechanism for retarding the motion of said toasting chamber and means for rendering said dash pot ineffective.

In witness whereof, I have hereunto set my hand April 16th, 1929.

ROBERT L. UHL.

CERTIFICATE OF CORRECTION.

Patent No. 1,769,893.    Granted July 1, 1930, to

ROBERT L. UHL.

It is hereby certified that error appears in the printed specification of the above numbered patent requiring correction as follows: Page 1, line 5, for the word "of" read "or"; page 2, line 119, strike out the word "of"; page 4, line 43, claim 4, for the word "moving" read "movably"; and that the said Letters Patent should be read with these corrections therein that the same may conform to the record of the case in the Patent Office.

Signed and sealed this 5th day of August, A. D. 1930.

Wm. A. Kinnan,
Acting Commissioner of Patents.

(Seal)

ber has moved through a predetermined distance.

20. A toaster or the like comprising a supporting frame, spaced walls defining a toasting chamber pivotally mounted in a substantially vertical position upon said supporting frame whereby said toasting chamber may be swung between predetermined limiting positions, electrical heating means mounted within said chamber, said chamber being provided with a top opening through which a slice of bread or the like may be inserted in said chamber and a bottom opening through which the toasted slice may be ejected from said chamber, a trap door hinged to close said bottom opening and thereby support said slice during the toasting operation, a bracket mounted upon said supporting frame operative to maintain said trap door in its closed position as said toasting chamber is swung from its one limiting position to its other limiting position and for releasing said trap door to discharge said slice as the toasting chamber approaches its other limiting position, spring actuating means for moving said toasting chamber from its one to its other limiting position, adjustable link mechanism interposed between said spring actuating means and said pivotally mounted toasting chamber for transmitting the actuating force of said spring to said toasting chamber, a dash pot operably connected with said link mechanism for retarding the motion of said toasting chamber and means for rendering said dash pot ineffective.

In witness whereof, I have hereunto set my hand April 16th, 1929.

ROBERT L. UHL.

---

CERTIFICATE OF CORRECTION.

Patent No. 1,769,893.  Granted July 1, 1930, to

ROBERT L. UHL.

It is hereby certified that error appears in the printed specification of the above numbered patent requiring correction as follows: Page 1, line 5, for the word "of" read "or"; page 2, line 119, strike out the word "of"; page 4, line 43, claim 4, for the word "moving" read "movably"; and that the said Letters Patent should be read with these corrections therein that the same may conform to the record of the case in the Patent Office.

Signed and sealed this 5th day of August, A. D. 1930.

Wm. A. Kinnan,
Acting Commissioner of Patents.

(Seal)